United States Patent
Heuer

(10) Patent No.: US 8,836,591 B2
(45) Date of Patent: Sep. 16, 2014

(54) BROADCASTING RECEIVING SYSTEM

(75) Inventor: Christian Heuer, Lamspringe (DE)

(73) Assignee: Delphi Delco Electronics Europe GmbH (DE)

( * ) Notice: Subject to any disclaimer, the term of this patent is extended or adjusted under 35 U.S.C. 154(b) by 577 days.

(21) Appl. No.: 12/562,345

(22) Filed: Sep. 18, 2009

(65) Prior Publication Data

US 2010/0066618 A1    Mar. 18, 2010

(30) Foreign Application Priority Data

Sep. 18, 2008 (DE) .......................... 10 2008 047 937

(51) Int. Cl.
| | |
|---|---|
| *H01Q 1/32* | (2006.01) |
| *H01Q 21/24* | (2006.01) |
| *H04B 7/08* | (2006.01) |
| *H01Q 3/34* | (2006.01) |
| *H01Q 21/20* | (2006.01) |
| *H04B 7/10* | (2006.01) |

(52) U.S. Cl.
CPC ............... *H01Q 1/32* (2013.01); *H04B 7/0814* (2013.01); *H01Q 3/34* (2013.01); *H01Q 21/20* (2013.01); *H04B 7/0871* (2013.01); *H01Q 21/24* (2013.01); *H04B 7/086* (2013.01); *H04B 7/10* (2013.01)
USPC .......................................... 343/713; 455/140

(58) Field of Classification Search
USPC ............ 343/711, 713, 853; 342/372; 455/140
See application file for complete search history.

(56) References Cited

U.S. PATENT DOCUMENTS

| | | | | |
|---|---|---|---|---|
| 4,166,274 | A | * | 8/1979 | Reudink et al. ................ 342/376 |
| 5,751,249 | A | * | 5/1998 | Baltus et al. ................... 342/372 |
| 6,201,504 | B1 | * | 3/2001 | Aminzadeh et al. .......... 343/713 |
| 6,911,946 | B2 | * | 6/2005 | Lindenmeier ................. 343/713 |

* cited by examiner

*Primary Examiner* — Michael C Wimer
(74) *Attorney, Agent, or Firm* — J. Gordon Lewis

(57) ABSTRACT

To improve the signal/noise ratio of a radio reception system intended for a vehicle, comprising multiple antennas having marked radiation characteristics with a directional effect, in each instance, it is proposed to orient the antennas in the vehicle at spatial sectors, with the proviso that their individual radiation characteristics supplement one another to produce a specific required radiation characteristic. For this purpose, the signals of the antennas are combined in an active combiner, with the interposition of amplifiers, and a sum signal is passed to a receiver by way of an output-side line.

9 Claims, 5 Drawing Sheets

BROADCASTING RECEIVING SYSTEM

CROSS REFERENCE TO RELATED APPLICATIONS

This application claims priority from German Application Serial no. DE102008047937.3 filed on Sep. 18, 2008, the disclosure of which is hereby incorporated herein by reference.

BACKGROUND

The invention relates to a radio reception system with at least two different antennas having marked directional effect.

Radio reception systems in which the signals of multiple antennas are implemented in order to improve the reception quality of a receiver are in use in the form of diversity systems, for example.

Diversity systems that are intended for reception of FM radio signals in vehicles, in which multiple antennas are connected with a diversity module on the input side, which module is connected, on the output side, with a receiver, by way of an HF line, whereby a sum signal runs by way of the HF line, consisting of two selected antenna signals, one of which has passed through a phase rotation device, are known from EP 1 763 151 A2, which has a corresponding application published as US2007058761 published on Mar. 15, 2007, the disclosure of which is hereby incorporated herein for reference, for example. There, the diversity module is characterized by two signal paths that have been brought together in a summation element, one of which paths contains the phase rotation device configured as a digitally addressable component, and each of which paths is connected with the antennas on the input side, by means of a signal selection switch that can be addressed by means of a control device. The signal selection switch is set up for producing a connection between the two signal paths with two of the antennas selected from the group of the input-side antennas, as a function of the quality of the sum signal, particularly the occurrence of interference, whereby the discrete phase angles assigned, in fixed manner, to the individual positions of the signal selection switches, are set as a function of the phase value matrix stored in the memory of the control device. The discrete values of the phase rotation angles are selected on the basis of the radiation diagrams of the antennas mounted on the vehicle, with regard to representing maximal diversity efficiency and the smallest possible number of discrete values of the phase angles.

According to this reference, diversity efficiency is understood to mean a parameter that describes the performance capacity of a multi-antenna system, which parameter corresponds to the number of notionally available de-correlated reception signals. At the summation point, it is not an absolutely same-phase setting of the signals to be summed up, but rather a combination that provides a maximal signal/noise ratio that is aimed at.

There is another disclosure, EP 1 126 631 B1, which has a corresponding U.S. patent issued as U.S. Pat. No. 6,925,293 to Lindenmeier et al and which issued on Aug. 2, 2005, which is hereby incorporated herein by reference in its entirety. This patent discloses another diversity system, which differs from the one described above essentially in that a phase rotation device is disposed ahead of a summation point at which the signal paths are brought together, in the course of the one path, which device rectifies the signals to be summed up, to have the same phase. The sum signal that is then formed is subsequently passed to demodulation. The processes of summation of the two signal paths as well as phase rotation in the region of the one signal path are moved into a reception device, and a multi-antenna system that is disposed spatially separate from the reception device is provided with addressable selection switches, by way of which any desired connections between the two signal paths as well as any one of the multiple antennas can be produced. By means of an interference detector that checks the sum signal, the set-up is such that the selection switches are changed to a different constellation of these switches when interference occurs, on the basis of a list of possible switching positions of the selection switches, which list is stored in memory in a logical switching device of the multi-antenna system, in the manner of a matrix, and specifically, this occurs with regulation of the phase rotation device in accordance with a maximal signal/noise ratio.

A characteristic of the nature of these known systems consists in that measures for taking into consideration, i.e. improving the signal/noise ratio are essentially restricted to the selection of antenna signals that are combined at a summation point, with at least approximately the same phase.

Frequently, a semi-spherical radiation characteristic is required for an antenna array that is intended for mobile reception in vehicles, particularly for satellite reception (e.g. Sirius or XM), in which system beam forming, namely orientation toward the satellite, is not provided. However, in comparison with beam forming, this leads to an unavoidable deterioration of the signal/noise ratio. The causes of the interferences that are unavoidably coupled in by way of the antennas are manifold, and these disruptive signal components cannot be eliminated by means of simple amplification, in any case. They always have the effect of reducing the reception quality.

Against this background, it is one of the benefits of the invention to structure a radio reception system of the type indicated initially, in simple manner, with regard to an advantageous signal/noise ratio.

SUMMARY

This benefit is accomplished, in the case of such a system, by means of an array of a plurality of antennas installed into a vehicle wherein each antenna has a radiation characteristic with a marked directional effect. There is also a line configured for transmission of a reception signal to a receiver, and at least one amplifier configured to receive and amplify at least one signal from at least one antenna of said plurality of antennas, and through the line for transmission of a reception signal. There is also a summation element coupled to the amplifier, wherein the summation element is configured to sum at least one signal from a first antenna with at least one signal from a second antenna taken from the plurality of antennas.

In this case, each of the antennas are positioned in the vehicle so that individual radiation characteristics of all of the antennas supplement one another to at least approximately yield a required radiation characteristic.

Accordingly, one benefit of the invention is that an all-around characteristic of the reception system is achieved in that the signals of multiple such antennas are brought together, which antennas are positioned in the vehicle with the proviso that their individual radiation characteristics supplement one another to yield a specific required radiation characteristic. In this connection, it is presupposed that the radiation characteristics of the individual antennas have a marked directional effect, in each instance, so that, with reference to the individual antenna, attenuation influences of the surroundings, but particularly interference signals from a direction other than the marked direction, develop almost no perceptible effect. However, because the individual antennas are positioned taking their radiation characteristics, in each instance, into account, with the proviso that their radiation characteristics supplement one another spatially to produce an at least approximately all-around characteristic, there is always at least one antenna, on the average, independent of any vehicle movement, particularly a vehicle orientation relative to a transmitter, in each instance, that is in an approximately optimal reception position because of its directional effect. In this manner, in comparison with a single antenna having an all-around characteristic such as with a single omnidirectional antenna, an improved signal/noise ratio can be achieved in simple manner.

Thus, the signals of the individual antennas are first amplified separately and then brought together. Because of the directional effect of the individual antennas, the interferences, including noise, which would otherwise also unavoidably be amplified, can be kept within limits.

In at least one embodiment, at least one of the antennas are linearly polarizing elements of a circularly polarizing antenna array.

In at least one embodiment, a plurality of antennas are configured to receive terrestrial signals.

In at least one embodiment, the plurality of antennas are configured to receive satellite reception.

Fundamentally, this system can be set up for receiving terrestrial signals of video and audio broadcasting, i.e. for linear polarization. However, use in the sector of satellite reception, in other words for a circularly polarized field, is also possible. With this design, fundamentally any desired antennas adapted to the waves to be received, which have a marked directional effect, in each instance, can be used, whereby a uniform all-around characteristic is always aimed at by way of the installation position of the antennas in the vehicle. Thus, independent of the vehicle position and orientation, it is possible to obtain essentially uniform reception conditions, characterized by a high signal/noise ratio.

The radio reception system according to one embodiment of the invention, particularly its antennas, can advantageously be used also in, i.e. together with a diversity system. In known manner, proceeding from an evaluation of the reception quality of the signals of the individual antennas, either an individual antenna or a group of antennas, whose combined signals represent the best possible reception signal at that time, in each instance, can be switched to the line that leads to the receiver. In every case, the circumstances that an influence of interferences coupled in by way of the antennas is kept as low as possible is advantageous for further implementation of the signals of the antennas in a diversity system. It is furthermore advantageous that interferences are directly reduced in the region of the antennas.

Thus reception system can include a diversity circuit, wherein the plurality of antennas are connected with the diversity circuit, which is configured to switch to at least one antenna of the plurality of antennas to receive qualitatively a better, an optimal or best signal. The diversity circuit can be set so that it selects the antennas with the strongest, optimal or best signal so that the reception system can yield a required radiation characteristic.

In this case, the diversity circuit is designed such that the diversity system is switched to at least two antennas with a highest signal.

The quality of the signal passed to a receiver can be further improved by means of the placement of phase shifters in at least part of the line branches that lead to the antennas, in accordance with the characteristics of claim 7.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION

Figure 1:
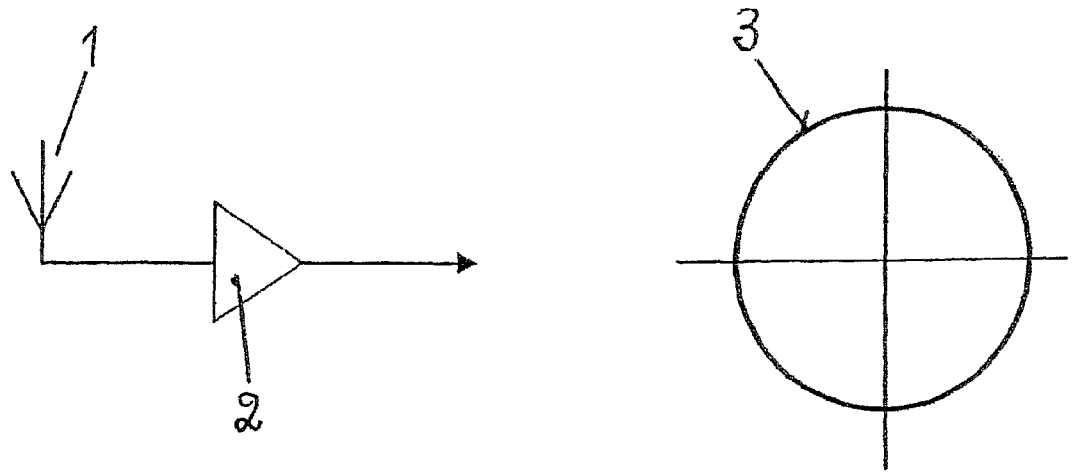
FIG. 1 is a representation of a conventional principle of an active antenna array.

FIG. 1 shows a prior art generally known fundamental concept of an active antenna, comprising an antenna 1 whose signal is passed by way of an amplifier 2, whereby an azimuthally uniform radiation characteristic 3 is obtained, as a function of the concrete configuration of antenna 1 and the polarization of the field to be received.

While it is true that such a radiation characteristic is fundamentally desirable in the case of use in a vehicle with a constant change in direction of the travel movement, it also lowers the reception quality, as the result of constantly changing ambient influences, by means of attenuation, multi-path reception, interference signals, etc., in that in addition to a useful signal, undesirable signal components are necessarily coupled in and equally amplified, so that accordingly, the signal/noise ratio can be worsened. This therefore completely non-selective reception can be of significantly impaired quality, depending on the local conditions.

Figure 2:
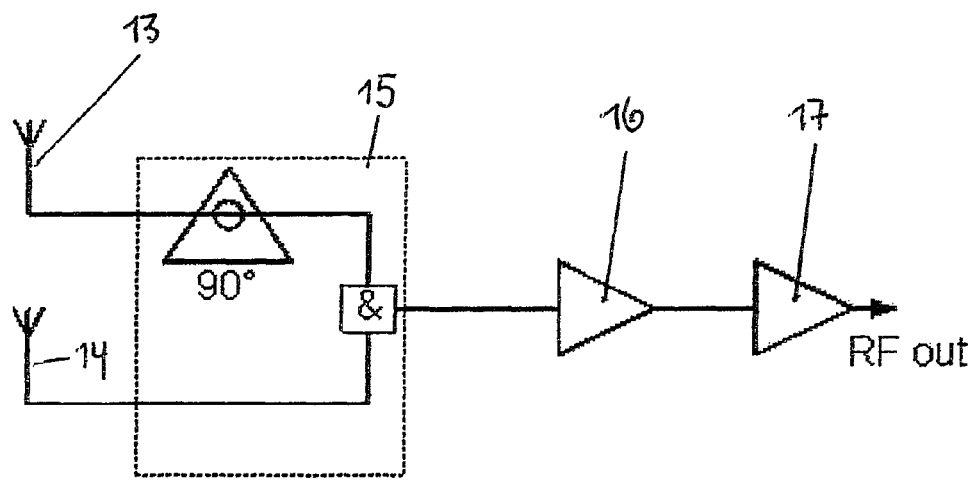
FIG. 2 is a representation of a conventional principle of phase-optimized combining of the signals of two antennas.

FIG. 2 shows a principle of phase-optimized addition of the signals of two antennas 13, 14 in a combiner 15 whose sum signal is implemented after amplification in two amplifiers 16, 17 that are switched one behind the other, corresponding to the state of the art explained initially. It is significant, in this connection, that the signals of the individual antennas 13, 14 are always combined first, and a sum signal is amplified only after that.

Figure 3:
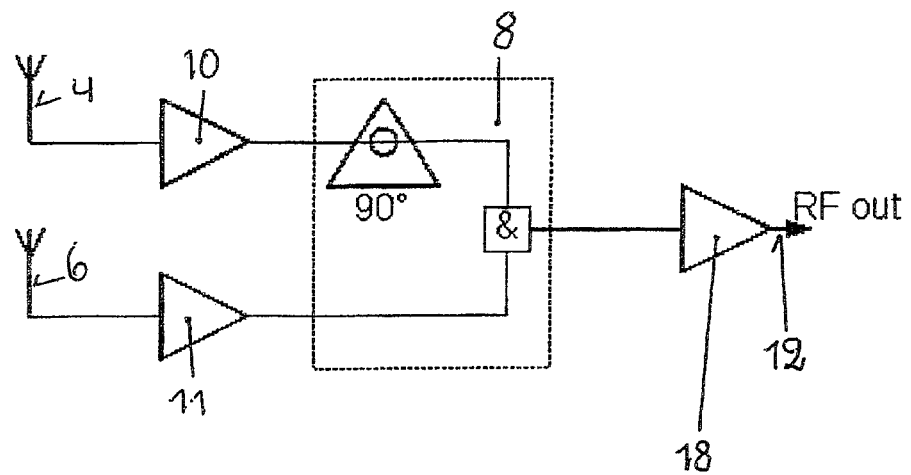
FIG. 3 is a representations of an expanded principle of an active antenna array, according to the invention.
Figure 4:
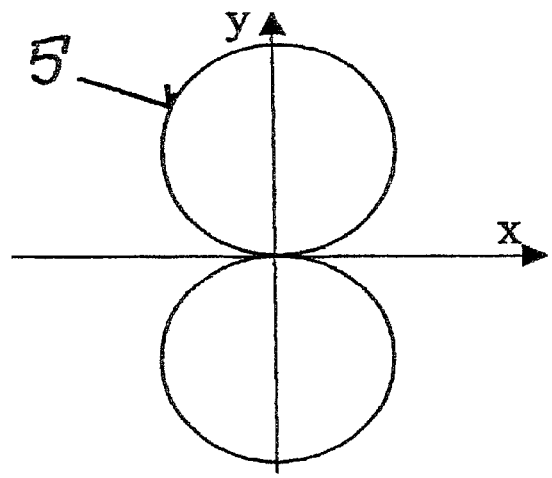
FIG. 4 is an exemplary representation of the radiation characteristic of an antenna, in each instance.
Figure 5:
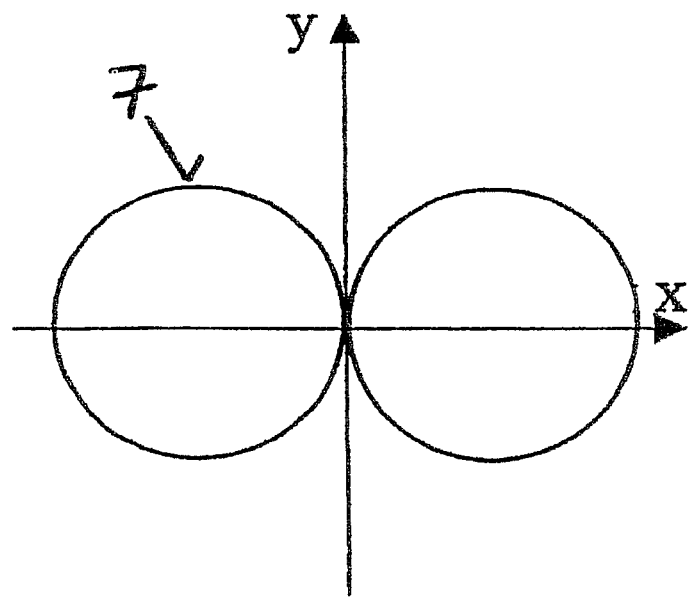
FIG. 5 is an exemplary representation of the radiation characteristic in a second instance.
Figure 6:
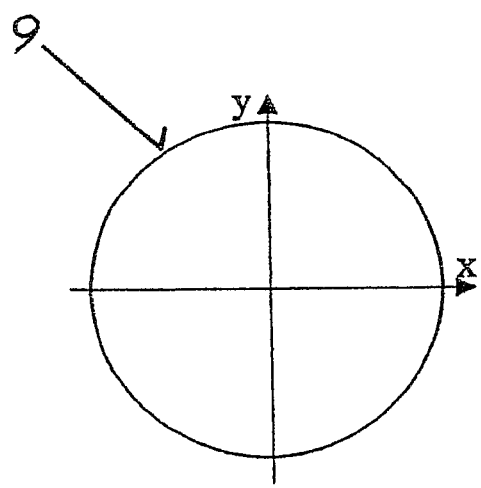
FIG. 6 an example of a radiation characteristic of a multi-antenna array according to the invention.

FIG. 3, shows a first embodiment of the invention which shows a first antenna 4, whose radiation characteristic 5 is shown in FIG. 4, and a second antenna 6, whose radiation characteristic 7 is shown in FIG. 5. These radiation signals are brought together in an active combiner 8, such that a sum signal is formed, so that a specific required radiation characteristic 9 according to FIG. 6 is obtained from this superimposition of at least two antenna signals. The representation according to FIG. 3 is characterized, as an example, by only two antennas 4, 6. However, a sum signal can be formed in this way from three and more antenna signals, by way of a combiner.

The antennas 4, 6 have radiation characteristics, in each instance, having a marked directional effect, as shown in FIGS. 3 and 4 as an example. The term "marked directional" in relation to antennas has been established as a term of art in U.S. Pat. No. 2,636,122 to A. C. Hayes in column 4 line 64. Another example, is found in U.S. Pat. No. 6,075,330 column 1 lines 10-20 wherein this description is hereby incorporated herein by reference. Another example of the term "marked directional" involves U.S. Pat. No. 1,546,731 to Herzog which issued on Jul. 21, 1925, which indicates that "marked directional" characteristics result in the strongest currents being induced in an antenna when it is pointing in the direction of approaching radio waves. Thus, for example, FIGS. 3 and 4 show that the reception signals can be approximately 90 degrees out of phase. In alternative embodiments, particularly with embodiments involving more than two antennas, the reception signals can be less than 90 degrees out of phase, such as between 60 and 90 degrees out of phase, between approximately 45 and 60 degrees out of phase, and between approximately 30 degrees and 45 out of phase, or even some marked directional difference less than 30 degrees out of phase.

At least part of the antennas 4, 6 can be linearly polarizing elements of a circularly polarizing antenna array; their reception signals are added in the 90° phase combiner 8 after amplification, in each instance, by means of the amplifier 10, 11. Thus, in this case, there is an antenna 4 positioned with an output into an input of amplifier 10, wherein the amplifier 10 has an output which communicates with an input of combiner 8. In addition, antenna 6 has an output in communication with an input of amplifier 11, wherein amplifier 11 has an output into an input of combiner 8.

Thus, a signal having an improved signal/noise ratio as compared with the antenna array according to FIG. 1 is available at the output 12 of the combiner 8, which signal is passed to a receiver by way of an amplifier 18.

In this embodiment as with subsequent embodiments, the plurality of antennas such as antennas 4 and 6 are positioned in the vehicle so that individual radiation characteristics of all of said plurality of antennas 4, 6, 24 (see for example FIG. 9) supplement one another to at least approximately yield a required radiation characteristic. The required radiation characteristic is one which results in a reduced signal to noise ratio relative to the prior art of FIG. 1, which results in a reception signal of sufficient quality so that it results in a perceptible reception improvement for a user across different reception fields.

The amplifiers 10, 11, form a first amplification stage, and amplifier 18, forms a second amplification stage. Essentially, the first amplification stage is positioned before the combiner 8, or essentially between either antenna 4 or antenna 6 and combiner 8, while the second amplifier 18 is positioned after combiner 8.

At least two antennas 4, 6 can be directed at spatial sectors, in each instance, taking into consideration their individual radiation characteristics 5, 7 and the properties of the field. In this case, a specific required radiation characteristic can be achieved by means of combining signals. Thus, for example in at least one instance antenna 4 can be directed at a different spatial sector than antenna 6, such that In the drawing FIGS. 7 to 9, functional elements that agree with those in FIG. 3 are numbered accordingly, so that a repeated description in this regard is not necessary.

Figure 7:
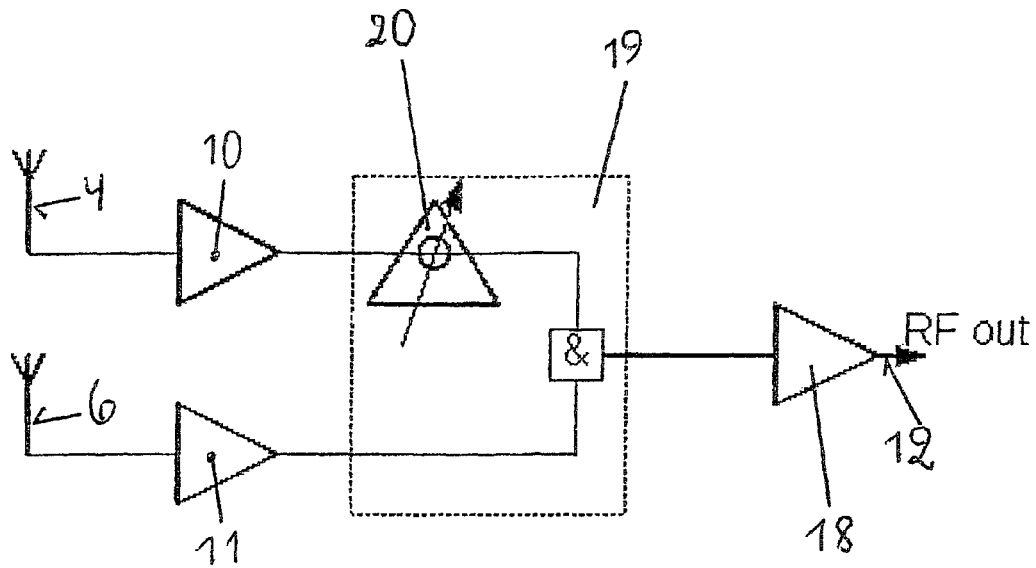
FIG. 7 a generalized representation of a principle, according to the invention, of combining the signals of two antennas.

In the representation according to FIG. 7, the principle according to FIG. 3 is generalized to the effect that by way of a combiner 19 that contains a variable phase shifter 20 in a line branch that is connected with the antenna 4, so that an addition of the signals of the two antennas 4, 6, is optimized with regard to phasing.

Figure 8:
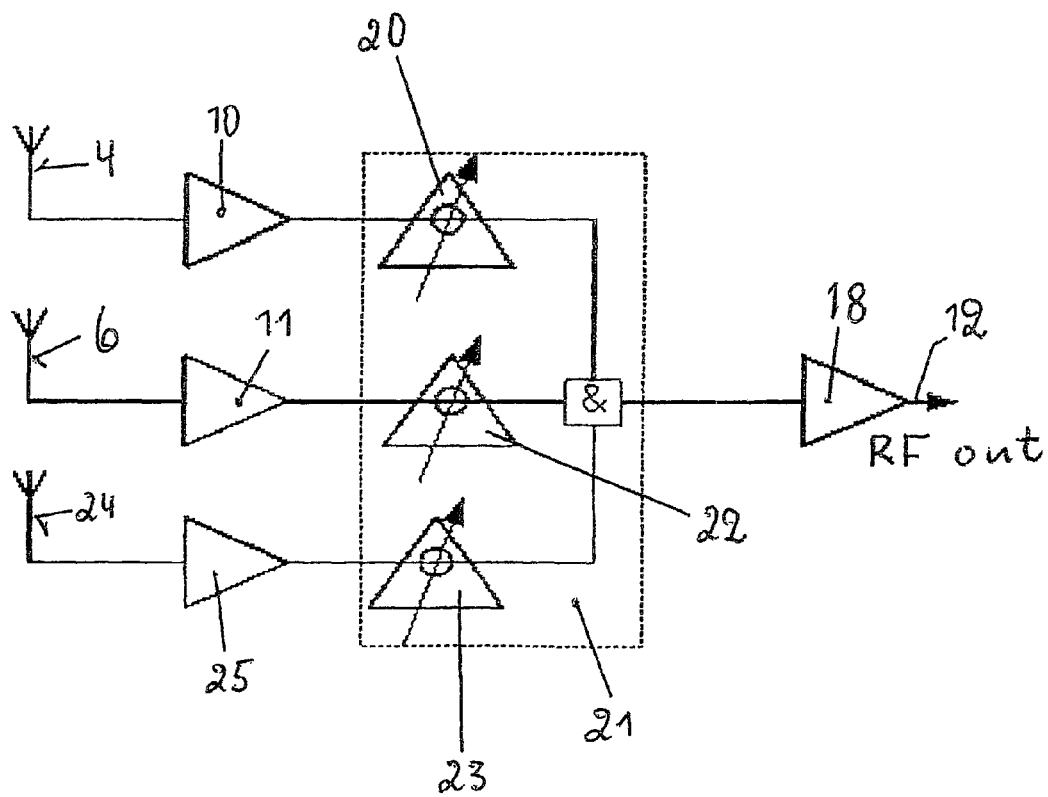
FIG. 8 an expansion of the principle of FIG. 7 to more than two antennas.

FIG. 8 shows an expansion of the principle of FIG. 7 to three and more antennas 4, 6, 24, whereby an amplifier 10, 11, 25 is disposed in each line branch of an antenna, ahead of a combiner 21, and whereby each line branch has a phase shifter 20, 22, 23 assigned to it. However, it is possible to do without one of the three phase shifters 20, 22, 23 shown.

Figure 9:
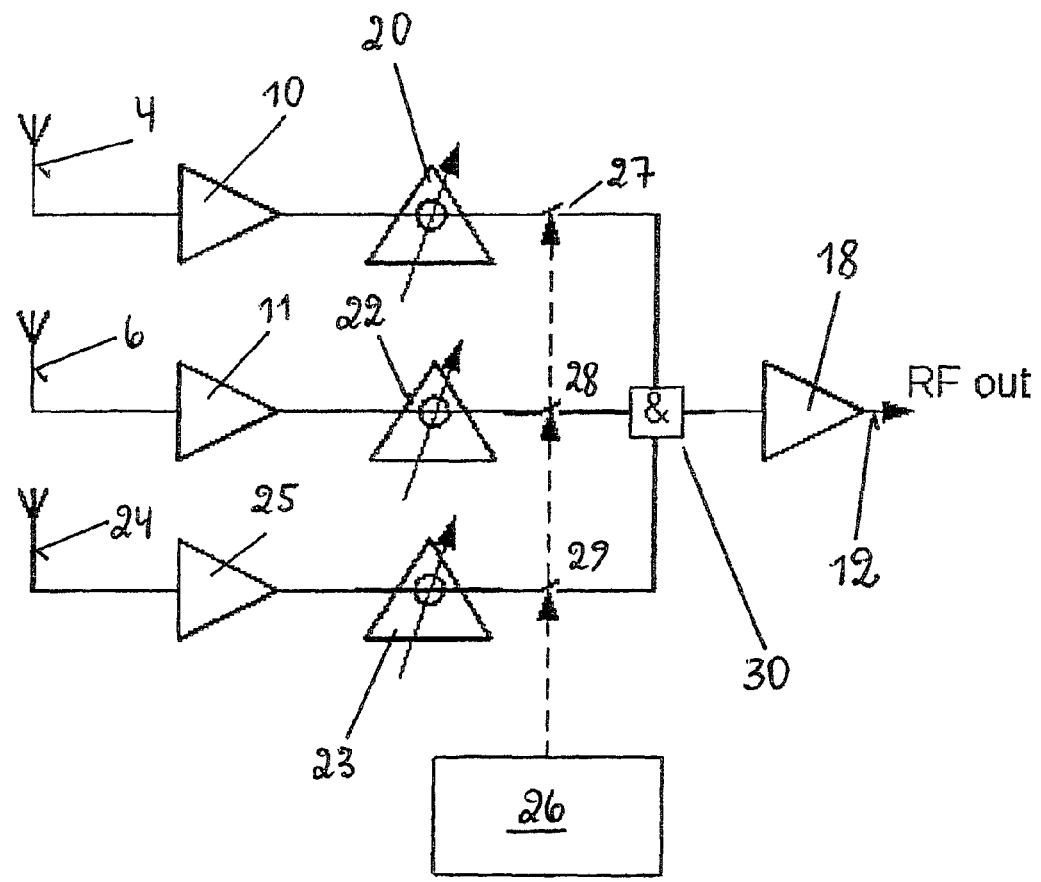
FIG. 9 combining the principle according to the invention with a diversity circuit.

FIG. 9 shows combining the principle according to the invention with a diversity circuit 26 that stands in an effect connection with switches 27, 28, 29 in the line branches of the antennas 4, 6, 24, so that a sum signal is formed at a summation point 30, which signal corresponds to the addition of the signals of all the antennas or a group of selected antennas, in accordance with the reception quality of the individual antennas. In a borderline case, this can also be the signal of only one antenna of the multi-antenna array shown.

Each line branch, in turn, is equipped with a variable phase shifter 20, 22, 23, so that the representation of an addition of the signals that has been optimized with regard to phasing is possible.

In place of variable phase shifters, elements that bring about an established phase shift are also possible.

All the representations of FIGS. 7 to 9 have a first amplification stage, which is represented by the amplifiers 10, 11, 25. These embodiments have this feature in common such that this amplification stage is before any addition of the signals, in other words directly after the antenna 4, 6, 24 but before summation point 30. A second amplification stage, represented by the amplifier 18, is situated only in the line branch that carries the sum signal.

Actually, a second amplification stage is not always necessary. However, it is usually required due to the attenuation by means of the phase shifters and because of the input-side requirements of the subsequent tuner.

Accordingly, while several embodiments of the present invention have been shown and described, it is to be understood that many changes and modifications may be made thereunto without departing from the spirit and scope of the invention as defined in the appended claims.

REFERENCE SYMBOL LIST 1. antenna
2. amplifier
3. radiation characteristic
4. antenna
5. radiation characteristic
6. antenna
7. radiation characteristic
8. combiner
9. radiation characteristic
10. amplifier
11. amplifier
12. output
13. antenna
14. antenna
15. combiner
16. amplifier
17. amplifier 18. amplifier
19. combiner
20. phase shifter
21. combiner
22. phase shifter
23. phase shifter
24. antenna
25. amplifier
26. diversity circuit
27. switch
28. switch
29. switch
30. summation point

What is claimed is:

1. A broadcasting receiving system for a vehicle comprising:
   a) an array of a plurality of antennas installed into a vehicle in juxtaposition wherein each antenna includes linearly polarizing elements and has a radiation characteristic with a marked directional effect differing from and complimentary to the radiation characteristic of each of the remaining antennas, and wherein their individual radiation characteristic supplement one another to yield a specific required composite radiation characteristic;
   b) a separate line for each antenna configured for transmission of a reception signal from an associated antenna to a receiver;
   c) a plurality of amplifiers, wherein an individual amplifier is interconnected to each of the antennas through a dedicated associated line, and wherein at least one amplifier is configured to separately receive and amplify at least one signal from an associated antenna of said plurality of antennas;
   d) an active summation element coupled separately to receive inputs from each said amplifier, said summation element configured to sum at least one signal from a first antenna with at least one signal from a second antenna taken from said plurality of antennas; and
   e) a single common output amplifier interconnecting an output of said active summation element with said receiver,
   wherein each of said plurality of antennas are positioned in the vehicle so that individual radiation characteristics of all of said plurality of antennas supplement one another spatially to at least yield a selected all-around symmetrical radiation characteristic, and affect a characteristic system signal-to-noise ratio exceeding that produced by the system employing any single antenna.

2. The receiving system as in claim 1, wherein at least one of said plurality of antennas are linearly polarizing elements of a circularly polarizing antenna array.

3. The receiving system as in claim 1, wherein said plurality of antennas are configured to receive terrestrial signals.

4. The receiving system as in claim 1, wherein said plurality of antennas are configured to receive satellite reception.

5. The receiving system as in claim 1, further comprising a diversity circuit, wherein said plurality of antennas are connected with said diversity circuit, which is configured to switch to at least one antenna of said plurality of antennas to receive qualitatively a best signal.

6. The receiving system as in claim 5, wherein said diversity circuit is designed such that the diversity system is switched to at least two antennas with a highest signal.

7. The receiving system as in claim 1, further comprising phase shifters disposed between said selection element and said plurality of antennas.

8. The receiving system as in claim 1, wherein a first antenna taken from said plurality of antennas is orientated towards a first spatial sector and a second antenna taken from said plurality of antennas is orientated towards a second spatial sector.

9. A broadcasting receiving system for a vehicle comprising:
   a) an array of a plurality of antennas installed into a vehicle in juxtaposition wherein each antenna includes linearly polarizing elements and has a radiation characteristic with a marked directional effect differing from and complimentary to the radiation characteristic of each of the remaining antennas, and wherein their individual radiation characteristic supplement one another to yield a specific required composite radiation characteristic;
   b) a separate line for each antenna configured for transmission of a reception signal from an associated antenna to a receiver;
   c) a first amplifier configured to receive and amplify at least one signal from at least one antenna of said plurality of antennas through a first dedicated associated line, and a second amplifier configured to receive and amplify at least one signal from another of said plurality of antennas through a second dedicated associated line;
   d) an active summation element coupled separately to receive inputs from each said amplifier, said summation element configured to sum at least one signal from a first antenna with at least one signal from a second antenna taken from said plurality of antennas; and
   e) a first variable phase shifter arranged between said first amplifier and said summation element, and a second variable phase shifter arranged between said second amplifier and said summation element,
   wherein each of said plurality of antennas are positioned in the vehicle so that individual radiation characteristics of all of said plurality of antennas supplement one another spatially to at least yield a selected symmetrical radiation characteristic, and affect a characteristic system signal-to-noise ratio exceeding that produced by the system employing any single antenna.

* * * * *